United States Patent Office 3,629,359
Patented Dec. 21, 1971

3,629,359
METHOD FOR PREPARING ORGANOPOLY-SILOXANE ELASTOMERS
Siegfried Nitzsche, Jurgen Burkhardt, and Karl-Heinrich Wegehaupt, Burghausen, Upper Bavaria, Germany, assignors to Wacker-Chemie G.m.b.H., Munich, Bavaria, Germany
No Drawing. Filed Sept. 24, 1969, Ser. No. 860,788
Claims priority, application Germany, Sept. 25, 1968, P 17 94 219.7
Int. Cl. C07f 7/22
U.S. Cl. 260—825         16 Claims

ABSTRACT OF THE DISCLOSURE

Linear, liquid organopolysiloxanes are vulcanized and cured to form elastomers employing polycyclicdiorganopolysiloxanes containing at least one group of the formula

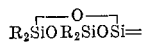

where R is a monovalent hydrocarbyl or substituted hydrocarbyl radical and an acid catalyst. The silicone rubber so produced adheres firmly to siliceous substrates and may be used to form laminates of glass.

---

This invention relates to a method for vulcanizing silicone rubber by incorporating in a liquid organopolysiloxane a polycyclicdiorganopolysiloxane as crosslinker and an acid catalyst.

It is an object of this invention to introduce a novel room temperature vulcanizing silicone rubber stock. A further object is a novel vulcanizing system for silicone rubber. A further object is a method for vulcanizing silicone rubber in contact with a siliceous substrate whereby the silicone rubber is firmly adhered to said substrate. Other objects and advantages of this invention are detailed in or will be apparent from this disclosure and appended claims.

The composition of this invention is a mixture of a liquid diorganopolysiloxane, a polycyclicorganopolysiloxane containing at least one group of the formula

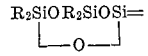

where R is a monovalent hydrocarbyl or substituted hydrocarbyl radical and an acid catalyst which promotes the rearrangement of siloxane bonds. This mixture will cure at room temperature (i.e. 15° to 35° C.) to form an elastomer and is particularly useful as an elastic coating agent or adhesive for siliceous substrates such as glass.

The base polymers employed herein to produce silicone rubbers are liquids at room temperature and are essentially linear diorganosiloxane polymers wherein the monovalent organic substituents are hydrocarbon radicals, halogenated hydrocarbon radicals, nitrile-substituted hydrocarbon radicals and carboxyl substituted hydrocarbon radicals. Such organic substituents on siloxane polymers are well known in the art and include, inter alia, methyl, ethyl, propyl, octadecyl, and other alkyl radicals; vinyl, allyl, methallyl, octadecenyl and other alkenyl radicals; cycloaliphatic radicals such as cyclopropenyl, cycloheptenyl, cyclobutyl and cyclooctadecyl radicals; ethylphenyl, methyldiphenyl, dipropylphenyl and other alkaryl radicals; phenylethyl, phenylpropyl and other aralkyl radicals; aryl radicals such as phenyl, xenyl and biphenyl radicals; and substituted derivatives of the foregoing such as 3,3,3-trifluoropropyl, beta-cyanoethyl, para-chlorophenyl,

—(CH$_2$)$_3$COOH chloromethyl, bromomethyl, iodomethyl, perfluorovinyl, chlorobromofluoroethyl and perchlorophenyl. Because of commercial availability, the preferred diorganosiloxane polymers contain methyl radicals as at least 50% of the organic substituents, the remaining substituents being phenyl, ethyl, 3,3,3-trifluoropropyl and/or vinyl radicals.

The liquid diorganopolysiloxane base polymer can be a homopolymer, a copolymer or mixtures thereof and can include a variety of polymeric species. The base diorganosiloxane polymer should be liquid at room temperature and is preferably (1) a monocyclicdiorganopolysiloxane which can be symmetrically or unsymmetrically substituted, (2) an α,ω-dihydroxydiorganopolysiloxane having from 3 to 1000 and more particularly 5 to 100 siloxane units per molecule, (3) a mixture of (1) and (2), or (4) a mixture of a solid monocyclicdiorganopolysiloxane in a liquid diorganopolysiloxane.

The liquid monocyclicdiorganopolysiloxanes which are liquid at room temperature and are operable herein are exemplified by phenylpentamethylcyclotrisiloxane, vinylpentamethylcyclotrisiloxane and dimethylcyclosiloxanes of 4 to 7 siloxane units of the general formula (Me$_2$SiO)$_x$ where Me is CH$_3$ and $x$ is 4 to 7.

The diorganopolysiloxanes having a hydroxyl group on each terminal silicon atom can be defined by the formula HO(R$_2$SiO)$_n$H where R represents the organic substituents and $n$ is 3 to 1000. If $n$ is less than 3, the molecules will not be liquid at room temperature and if $n$ is greater than 1000, the polymer is undesirably viscous and processing is difficult. It has not previously been recognized and it is a totally unexpected advantage of this invention that not only the cyclic diorganopolysiloxanes but also the hydroxyl endblocked diorganopolysiloxanes can be vulcanized and cured to elastomers by crosslinking with polycyclicorganopolysiloxanes in the presence of acid catalysts. Because of commercial availability, the preferred hydroxyl endblocked diorganosiloxane polymers contain at least 75 mole percent of dimethylsiloxane units with the remaining units being phenylmethylsiloxane, diphenylsiloxane, vinylmethylsiloxane and/or 3,3,3-trifluoropropylmethylsiloxane units.

A preferred embodiment of the present invention is to execute the vulcanization of the base polymer at room temperature. The preferred base polymers for this embodiment are hexaorganotrisiloxanes, hydroxyl endblocked diorganosiloxane polymers of 5 to 100 siloxane units or mixtures thereof. These polymers are preferred because they exhibit rapid viscosity increase at room temperature.

It has previously been suggested to prepare organopolysiloxane elastomers by crosslinking liquid diorganopolysiloxanes employing polycyclicorganopolysiloxanes as crosslinkers and alkaline catalysts. The elastomers thus obtained did not adhere to substrates. It has now been found that when acid catalysts are employed, the elastomers prepared will adhere to siliceous substrates surprisingly firmly. Therefore, the method of the present invention is carried out with acid catalysts and is preferably used to adhere silicone rubber to siliceous surfaces and for coating siliceous articles. Examples of operable acid catalysts which promote rearrangement of siloxane bonds and are operable herein are phosphoronitrile chlorides, diphenylchlorophosphine, diphenylphosphoroxichloride and mixtures of hydrogen chloride and ferric chloride. Phosphoronitrile chlorides are preferred because of ready availability and because they have little or no deleterious effect on the stability of the cured elastomers. The acid catalysts are preferably employed in quantities of from 0.003 to 0.5% by weight based on the weight of the base diorganosiloxane polymer.

The crosslinking agent herein is a polycyclicorganopolysiloxane containing at least one

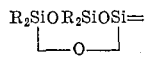

group per molecule. The organic substituents represented by R in the formula can be any of the monovalent hydrocarbon and substituted hydrocarbon radicals delineated above. It is preferred that the polycyclicorganopolysiloxane be liquid at room temperature to permit easy handling, mixing and pouring of the mixture.

Preferred polycyclicorganosiloxanes herein are those of the general formula

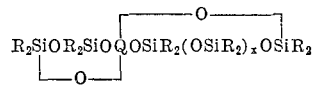

where R is as defined above, Q is $>$Si$<$ or

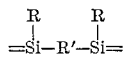

where R is as defined above, R' is a divalent atom or group and $x$ is 0 to 8. The divalent groups represented by R' include oxygen and sulfur atoms, divalent hydrocarbon radicals, e.g. methylene, polymethylene and arylene, radicals of the formula —NR— where R is as defined above and radicals of the formula —$O_n$(Si$R_2$O)$_y$Si$R_2O_m$— where R is as above defined, $n$ is 0 to 1, $m$ is 0 to 1, and $y$ is 0 to 50. R' can consist of various divalent radicals or of divalent radicals and atoms, especially those listed above, such as radicals of the formula

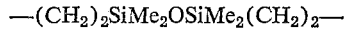

and —O(Si$Me_2$O)— where Me is $CH_3$. Preferred as R' is —$CH_2CH_2$—.

It has been found that when the base siloxane polymer employed is a cyclotrisiloxane and/or a hydroxyl endblocked diorganosiloxane polymer, the resulting rubber exhibits excellent mechanical strengths when the value of $x$ in the preferred polycyclicorganosiloxane formula above is greater than 0 (i.e. $x$ is 1 to 8).

Mixtures of various polycyclic organopolysiloxane crosslinkers can be used. Preferably the crosslinking agent (polycyclicorganopolysiloxane) is employed in amount of from 0.1 to 10% by weight based on the weight of base polymer diorganopolysiloxane employed.

The polycyclicorganopolysiloxane crosslinking agents can be prepared by known methods. For example, an organopolysiloxane containing at least one Si-H group such as hydrogenpentaalkylcyclotrisiloxane and 1,3-dihydrogentetraalkyldisiloxane can be reacted with and added to a suitable cyclic organopolysiloxane containing a hydrocarbon radical exhibiting aliphatic unsaturation such as a vinylheptaalkylcyclotetrasiloxane or vinylpentaalkylcyclotrisiloxane to introduce the desired

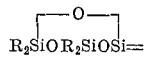

groups. Another method consists of condensing 1,3-dihydroxytetraalkyldisiloxanes with organosilicon compounds containing at least 3 halogen atoms bonded to silicon in each molecule, such as alkyltrichlorosilane and 1,2-bis-(alkyldichlorosilyl)ethane in the presence of an acid acceptor such as a tertiary amine such as triethyl amine or pyridine.

After mixing the diorganopolysiloxane base polymer, polycyclicorganopolysiloxane crosslinker and acid catalyst, the mixture polymerizes and crosslinks to form elastomers. This can be accelerated by heating, for example, to 60° to 100° C. The mixture is a freely pourable and forms heat-stable and glass-clear elastomers exhibiting high mechanical strength even in the absence of reinforcing fillers. The degree of polmerization and crosslinking can be controlled by selection of the type and proportion of polycyclicorganopolysiloxane employed.

In addition to the three required ingredients described in detail above, additives known for use in silicone rubber stocks can also be employed herein. Such known additives include reinforcing and non-reinforcing fillers (e.g. the incorporation of 5 weight percent of fume silica in the elastomers of this invention results in improved mechanical strength), pigments, soluble dyes, oxidation inhibitors, heat stabilizers, plasticizers and softeners. Such additives are not required however, and when used are employed in minimal proportions.

The elastomers of this invention are strongly adherent to siliceous substrates. This surprising property leads to the preferred use for these elastomers as elastic adhesive films between and coatings on siliceous articles such as glass, porcelain, ceramics, tile as well as concrete. The method of the present invention is particularly useful for preparing elastic, tension-free and shock-absorbing joints, especially for preparing bonded glass plates, coatings and sealings, for example, in buildings and also for embedding electronic equipment. The use of the method of the present invention for the preparation of bonded glass plates has the advantage that the low viscosity of the starting materials, even after being mixed, affords simplicity of application and the use of adhesives which often affect the stability of the elastomer and of fillers which affect the transparency is avoided. Thus, glass plates bonded with interlayers of organopolysiloxane elastomer exhibiting excellent thermal stability and optical clarity as well as excellent bond between glass and interlayer are produced in accordance with this invention.

The method of the present invention can be carried forward in the atmosphere in contrast to prior art methods employing polycyclicorganopolysiloxanes and alkaline catalysts which had to be carried forward under nitrogen or other inert gas. Further, the mixtures employed herein can have very low viscosities (i.e. lower than 25 cs. at 25° C.) which permits pouring around complex equipment.

The bicyclicorganopolysiloxanes employed in the examples which follow were prepared as follows.

(a)

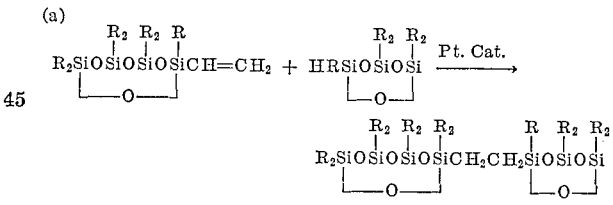

A mixture of 91 grams vinylheptamethylcyclotetrasiloxane and 0.1 ml. of a 0.6% by weight platinum containing solution of ethylene-platinum (II) chloride complex of the formula ($PtCl_2$—$C_2H_4$)$_2$ in benzene was charged to a reaction vessel and 61.5 g. of hydrogenpentamethylcyclotrisiloxane was added dropwise over a period of 45 minutes with concurrent stirring of the reaction mixture. The reaction was exothermic and the reaction mass temperature rose from 20° C. to 24° C. during the addition. After 10 hours of stirring at room temperature, the reaction mass was distilled under reduced pressure. The product obtained was 85 grams (56% of theory) of 1 - (heptamethylcyclotetrasiloxanyl-)2(pentamethylcyclotrisiloxanyl-)ethane having a boiling point of 93° C. at 0.4 mm. of Hg absolute, freezing point of 7° to 8° C. and $n_D^{25}$ of 1.4113.

(b)

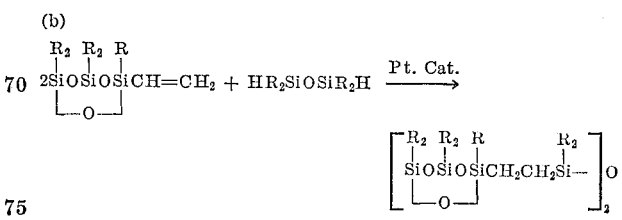

A mixture of 46.9 g. vinylpentamethylcyclotrisiloxane and 0.1 ml. of the platinum catalyst solution described above in (a) was charged to a reaction vessel and 13.4 g. of 1,3-dihydrogentetramethyldisiloxane was added dropwise at room temperature with concurrent stirring. After the addition was completed, the reaction mass was stirred for ten hours at room temperature and then the reaction mass was distilled under reduced pressure. The product obtained was 50 g. (83% of theory) of 1,3-bis(pentamethylcyclotrisiloxanylethylene-)tetramethyldisiloxane having a boiling point of 97° C. at 0.1 mm. Hg absolute and a freezing point of 35° C.

(c) 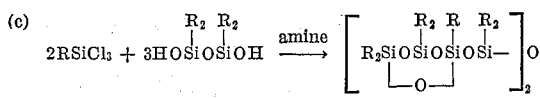

Solutions were prepared by adding 199 g. of methyltrichlorosilane to sufficient ethylacetate to constitute 1000 ml. and a mixture of 332 g. of 1,3-dihydroxytetramethyldisiloxane and 420 g. of triethylamine in sufficient ethylacetate to provide 1000 ml. of solution. The two solutions thus prepared were added in dropwise fashion to 2000 ml. of ethylacetate over a period of four hours employing two dropping funnels and with concurrent stirring of the reaction mass. The precipitated amine salt was removed by filtration and the ethylacetate was removed by distillation at about 12 mm. Hg absolute. The distillation of reaction product produced 227 g. (59% of theory) of 1,3-bis-pentamethylcyclotrisiloxanyloxy-)tetramethyldisiloxane having a boiling point of 85° C. at 0.2 mm. Hg absolute, freezing point of —4° C. and $n_D{}^{25}$ is 1.3969.

(d) 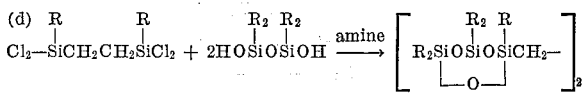

A mixture of 92 g. 1,3-dihydroxytetramethyldisiloxane and 120 g. of triethylamine was dissolved in sufficient ethylacetate to provide 400 ml. of solution and 71 g. of 1,2 - bis(methyldichlorosilyl-)ethane was similarly dissolved in sufficient ethylacetate to provide 400 ml. of solution. The two solutions thus obtained were simultaneously added dropwise to 800 ml. of ethylacetate from two dropping funnels over a period of four hours at room temperature and with concurrent stirring. The precipitated amine salt was removed by filtration and the ethylacetate was removed by distillation at 12 mm. Hg absolute. The residue was recrystallized from hexane. The product was 31 g. (25% of theory) of 1,2-bis(pentamethylcyclotrisiloxanyl-)ethane having a freezing point of 57 to 58° C. The same compound can be obtained by using vinyl pentamethylcyclotrisiloxane in place of the vinylheptamethylcyclotetrasiloxane in the procedure described above in (a).

The phosphoronitrilechloride auid catalyst employed in the examples was prepared in a known manner by admixing 400 g. of phosphoropentachloride with 130 g. of ammonium chloride in 1000 ml. of tetrachloroethane and heating the mixture to 135° C. until no more gas development could be detected. The solvent was then removed by distillation. The reaction product was then diluted by adding sufficient methylenechloride to provide a 30% by weight solution.

The following examples are provided to assist those skilled in the art in understanding and practicing this invention. The scope of the invention is set forth in the claims and is not limited by the examples. All viscosities were measured at 25° C.

EXAMPLE 1

A solution was prepared by mixing 500 mg. of 1,2-bis(pentamethylcyclotrisiloxanyl-)ethane in 50 g. of phenylpentamethylcyclotrisiloxane and 0.1 ml. of the solution of phosphoronitrilechloride in methylenechloride was added thereto. A glass-clear, freely-pourable product was obtained and cured at room temperature within 10 minutes to form a highly elastic film.

EXAMPLE 2

The procedure of Example 1 was repeated except that 500 mg. of 1,3 - bis(pentamethylcyclotrisiloxanylethylene-)tetramethyldisiloxane is used in place of the 1,2-bis(pentamethylcyclotrisiloxanyl-)ethane. A glass-clear, freely-pourable fluid curing to a highly elastic rubber product at room temperature within ten minutes was obtained.

EXAMPLE 3

The procedre of Example 1 was repeated exuept the bicyclotrisiloxanylethane mentioned was replaced by 500 mg. of 1-(heptamethylcyclotetrasiloxanyl-)2(pentamethylcyclotrisiloxanyl-)ethane. A highly viscous material results within 5 minutes at room temperature and this material cures within 24 hours at room temperature to form a highly elastic elastomer having excellent mechanical strength.

EXAMPLE 4

A mixture of 10 grams of phenylpentamethylcyclotrisiloxane, 6 g. 1,1 - diphenyltetramethylcyclotrisiloxane and 100 mg. 1-(heptamethylcyclotetrasiloxanyl-)2(pentamethylcyclotrisiloxanyl-)ethane was mixed with 0.05 ml. of the methylenechloride solution of phosphoronitrile chloride and applied to a glass plate. Within one hour at room temperature, a glass-clear, highly impact resistant, elastic coating was obtained on the glass plate. This coating adhered to the glass plate so firmly that when attempts are made to remove the film from the glass plate, the film breaks, thus, showing the adhesion of the film to the glass exceeds the cohesion of the film.

EXAMPLE 5

A mixture of 10 g. of hydroxyl endblocked dimethylpolysiloxane having an average of about 5 siloxane units per molecule and 100 mg. of 1,3-bis(pentamethylcyclotrisiloxanyloxy-)tetramethyldisiloxane was catalyzed with 0.02 ml. of the methylenechloride solution of phosphoronitrilechlorides desuribed above and the mixture was applied to a glass plate. Within 30 minutes at room temperature, a glass-clear, impact resistant, elastic coating was obtained on the glass plate. The coating adhered firmly to the glass plate and attempts to tear the coating from the glass plate resulted in rupturing the coating.

The procedure described above was repeated except that two glass plates were coated with the mixture and after 5 minutes, the two coated sides of the glass plates are placed against each other and vulcanization and cure are completed to form a sandwich of glass plates with a glass-clear, elastomeric inner layer. The sandwich was glass-clear and the glass plates were firmly bonded to each other.

EXAMPLE 6

A solution was prepared from 200 mg. of the bicyclicorganopolysiloxane employed in Examples 3 and 4 dissolved 20 g. of octamethylcyclotetrasiloxane and 0.03 ml. of the methylenechloride solution of phosphoronitrilechlorides was stirred into the solution. The mixture became viscous within one hour at room temptaure and was applied to glass plates which were each 3 mm. thick. The coated sides of the glass plates were placed against each other to form a glass plate—silicone elastomer—glass plate sandwich-like assembly. After five hours at room temperature, the glass plates are so firmly adhered to each other through the silicone elastomer bonding inner layer that attempts to separate the plates employing an electronic tear machine at a rate of 0.2 mm. per minute resulted in breaking the glass plates.

EXAMPLE 7

Equivalent results were achieved when Examples 1 and 2 were repeated employing in place of the methylenechloride solution of phosphoronitrilechlorides equivalent amounts of any of the following siloxane rearrangement acid catalysts: $C_6H_5NHPCl_2$, $C_6H_5N(CH_3)PCl_2$, $(C_6H_5)_2NPCl_2$, $CH_3NHPCl_2$, $(CH_3)_2CHNHPCl$, $C_6H_5CH_2NHPCl_2$, $[C_6H_5N=P-NH-C_6H_5]_2$, $C_6H_5N=P-NHCH_3$, $C_6H_5NHPOCl_2$, $C_{10}H_7NHPOCl_2$, $CH_3NHPOCl_2$, $(CH_3)_2CHNHPOCl_2$, $C_2H_5NHPOCl_2$,

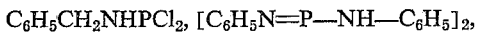

$(C_6H_5)_2PCl$, diphenylphosphoroxichloride and mixtures of hydrogen chloride and ferric chloride.

EXAMPLE 8

Equivalent results are achieved when Example 6 is repeated except in place of the octamethylcyclotetrasiloxane, 20 g. of any of the following is employed: A copolymer of 50 mol precent phenylmethylsiloxane and 50 mol percent dimethylsiloxane with OH endblocking and an average of 50 siloxane units per molecule; a hydroxyl endblocked copolymer of 75 mol percent dimethylsiloxane, 10 mol percent phenylmethylsiloxane, 10 mol percent 3,3,3-trifluoropropylmethylsiloxane and 5 mol percent phenylvinylsiloxane units with hydroxyl endblockers and an average of 35 siloxane units per molecule; an equimolar mixture of hydroxyl endblocked dimethylpolysiloxane of 25 siloxane units per molecule and cyclic dimethylsiloxane pentamer; a mixture of cyclic dimethylpolysiloxane tetramer, pentamer and hexamer having an average of 4.5 siloxane units per molecule; and a hydroxyl endblocked dimethylpolysiloxane of 350 siloxane units per molecule.

That which is claimed is:

1. A silicone rubber stock capable of vulcanizing at room temperature consisting essentially of (1) a liquid base siloxane polymer selected from the group consisting of monocyclic diorganosiloxanes containing 3 to 7 siloxane units per molecule, hydroxyl endblocked diorganosiloxanes containing 3 to 1000 siloxane units per molecule and mixtures thereof, at least 50 percent of the organic substituents in said siloxanes being methyl groups and any remaining organic radicals being selected from the group consisting of monovalent hydrocarbon radicals, halogenated hydrocarbon radicals, nitrile-substituted hydrocarbon radicals and carboxyl substituted hydrocarbon radicals, (2) as a crosslinking agent, a polycyclicorganopolysiloxane containing at least one group of the formula

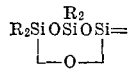

where R is selected from the group consisting of monovalent hydrocarbon radicals, halogenated hydrocarbon radicals, nitrile-substituted hydrocarbon radicals and carboxyl substituted hydrocarbon radicals and (3) an acid catalyst which promotes the rearrangement of siloxane bonds.

2. The silicone rubber stock of claim 1 wherein the base siloxane polymer is a cyclic hexaorganotrisiloxane, a hydroxyl endblocked diorganosiloxane of 5 to 100 siloxane units per molecule or a mixture of the foregoing.

3. The silicone rubber stock of claim 2 wherein at least 75% of the organic groups in the siloxane base polymer are methyl groups.

4. The rubber stock of claim 1 wherein the acid catalyst is a phosphoronitrilechloride.

5. The rubber stock of claim 1 wherein the polycyclicorganopolysiloxanes are of the general formula

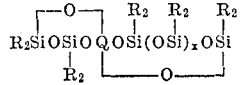

where R is selected from the group consisting of monovalent hydrocarbon radicals, halogenated hydrocarbon radicals, nitrile-substituted hydrocarbon radicals and carboxyl substituted hydrocarbon radicals, Q is

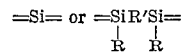

where R is as above defined, R′ is a divalent atom or group selected from the group consisting of oxygen, sulfur, divalent hydrocarbon radicals, —NR— where R is as above defined, and —$O_n(R_2SiO)_ySiR_2O_m$— where R is as above defined, n and m are 0 or 1, and y is 0 to 50, and x is 0 to 8.

6. The rubber stock of claim 5 wherein R′ is —$CH_2CH_2$—, —$O[Si(CH_3)_2O]_x$ or —$CH_2CH_2Si(CH_3)_2OSi(CH_3)_2CH_2CH_2$—

7. The rubber stock of claim 5 wherein x is 1 to 8.

8. A silicone rubber stock consisting essentially of a mixture of (1) 100 parts by weight of a base liquid siloxane polymer selected from the group consisting of monocyclic diorganopolysiloxanes containing 3 to 7 siloxane units per molecule, hydroxyl endblocked diorganopolysiloxanes containing 3 to 1000 siloxane units per molecule and mixtures of such polymers, the organic substituents in said siloxanes being selected from the group consisting of monovalent hydrocarbon radicals and substituted hydrocarbon radicals wherein the substituents and halogen atoms, nitrile groups, carboxyl radicals or mixtures thereof, (2) 0.1 to 10 parts by weight of a crosslinking agent which is a polycyclicorganopolysiloxane of the general formula

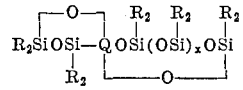

where x is 0 to 8, R is an organic substituent selected from the group consisting of monovalent hydrocarbon radicals and substituted hydrocarbon radicals, wherein the substituents are selected from the group consisting of halogen atoms, nitrile groups and carboxyl radicals, Q is

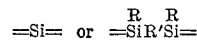

where R is as above defined and R′ is a divalent atom or group selected from the group consisting of —O—, —S—, —NR—, alkylene, arylene and —$O_n(R_2SiO)_ySiR_2O_m$— where R is as above defined, n is 0 or 1, m is 0 or 1 and y is 0 to 50, and (3) 0.003 to 0.5 parts by weight of phosphoronitrilechlorides.

9. A method for preparing organopolysiloxane elastomers comprising admixing (1) a liquid base siloxane polymer selected from the group consisting of monocyclic diorganosiloxanes containing 3 to 7 siloxane units per molecule, hydroxyl endblocked diorganosiloxanes containing 3 to 1000 siloxane units per molecule and mixtures thereof, at least 50 percent of the organic substituents in said siloxanes being methyl groups and any remaining organic radicals being selected from the group consisting of monovalent hydrocarbon radicals and substituted hydrocarbon radicals wherein the substituents are halogen atoms, nitrile groups, carboxyl groups or mixtures thereof, (2) as a crosslinking agent, a polycyclicorganopolysiloxane containing at least one group of the formula

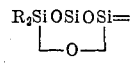

where R is a monovalent hydrocarbon radical or substituted hydrocarbon radical wherein the substituents are halogen atoms, nitrile groups, carboxyl groups or mixtures thereof, and (3) an acid catalyst which promotes the rearrangement of siloxane bonds, and exposing the mixture to the atmosphere at room temperature.

10. The method of claim 9 wherein the base siloxane polymer is a cyclic hexaorganotrisiloxane, a hydroxyl endblocked diorganosiloxane of 5 to 100 siloxane units per molecule or a mixture of such siloxane polymers.

11. The method of claim 10 wherein the base siloxane polymer has methyl groups of at least 75% of the organic substituents present.

12. The method of claim 9 wherein the acid catalyst is a phosphoronitrilechloride.

13. The method of claim 9 wherein the polycyclicorganopolysiloxanes are of the general formula

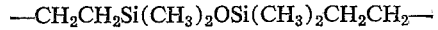

where R is a monovalent hydrocarbon radical or substituted hydrocarbon radical wherein the substituents are selected from the group consisting of halogen atoms, nitrile groups and carboxyl groups, Q is $=Si=$ or

where R is as above defined, R' is a divalent atom or group selected from the group consisting of oxygen, sulfur, a divalent hydrocarbon radical, —NR—, and —$O_n(R_2SiO)_ySiR_2O_m$— where R is as above defined, $n$ and $m$ are each 0 or 1 and $y$ is 0 to 50, and $x$ is 0 to 8.

14. The method of claim 13 wherein R' is ethylene, phenylene, —$O[Si(CH_3)_2O]_x$ or —$CH_2CH_2Si(CH_3)_2OSi(CH_3)_2CH_2CH_2$— and $x$ is 0 to 8.

15. The method of claim 13 wherein $x$ is 1 to 8.

16. The method for preparing organopolysiloxane elastomers comprising admixing (1) a liquid base siloxane polymer selected from the group consisting of monocyclic diorganosiloxanes containing 3 to 7 siloxane units per molecule, hydroxyl endblocked diorganosiloxanes containing 3 to 1000 siloxane units per molecule and mixtures thereof, at least 50 percent of the organic substituents in said siloxanes being methyl groups and any remaining organic radicals being selected from the group consisting of monovalent hydrocarbon radicals and substituted hydrocarbon radicals wherein the substituents are selected from the group consisting of halogen atoms, nitrile groups and carboxyl groups, (2) as a crosslinking agent, a polycyclicorganopolysiloxane containing at least one group of the formula

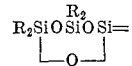

where R is a monovalent hydrocarbon radical or substituted hydrocarbon radical wherein the substituents are halogen atoms, nitrile radicals, carboxyl radicals or mixtures thereof, and (3) an acid catalyst which promotes the rearrangement of siloxane bonds, and exposing the mixture to the atmosphere at room temperature.

References Cited

UNITED STATES PATENTS

| | | | |
|---|---|---|---|
| 3,021,297 | 2/1962 | George | 260—37 |
| 3,186,967 | 6/1965 | Nitzsche et al. | 260—46.5 |
| 3,274,154 | 9/1966 | Kendrick et al. | 260—46.5 |
| 3,398,176 | 8/1968 | Nitzsche et al. | 260—448.2 |

DONALD E. CZAJA, Primary Examiner

M. I. MARQUIS, Assistant Examiner

U.S. Cl. X.R.

117—124 F; 161—193 R, 206 R; 260—37 SB, 46.5 E, 46.5 G